United States Patent [19]
Bowes et al.

[11] Patent Number: 5,708,313
[45] Date of Patent: Jan. 13, 1998

[54] SUMP PUMP

[75] Inventors: H. David Bowes, Erie, Pa.; Jeffrey S. Richmond, Northbrook, Ill.

[73] Assignee: Finish Thompson Inc., Erie, Pa.

[21] Appl. No.: 738,816

[22] Filed: Oct. 28, 1996

[51] Int. Cl.$^6$ .................................................. H02K 7/09
[52] U.S. Cl. ........................ 310/90.5; 310/63; 417/420; 417/423.12; 366/273
[58] Field of Search ............................ 310/90; 417/420, 417/423.12, 365; 366/273

[56] References Cited

U.S. PATENT DOCUMENTS

| | | | |
|---|---|---|---|
| 1,385,400 | 7/1921 | Scheibe . | |
| 4,036,565 | 7/1977 | Becker | 417/420 |
| 4,106,825 | 8/1978 | Ruyak | 308/139 |
| 5,017,102 | 5/1991 | Shimaguchi et al. | 417/420 |
| 5,160,246 | 11/1992 | Horiuchi | 417/365 |
| 5,300,849 | 4/1994 | Elsässer | 310/90.5 |
| 5,464,333 | 11/1995 | Okada et al. | 417/420 |
| 5,470,152 | 11/1995 | Rains | 366/273 |
| 5,533,803 | 7/1996 | Meier | 366/273 |

*Primary Examiner*—Steven L. Stephan
*Assistant Examiner*—Timothy A. Williams
*Attorney, Agent, or Firm*—Webb Ziesenheim Bruening Logsdon Orkin & Hanson, P.C.

[57] ABSTRACT

A sealess sump pump comprises an impeller chamber mounted at the bottom of a pump column, an impeller journaled in the impeller chamber, a rare earth driven magnet assembly fixed to rotate with the impeller, a rare earth driving magnet assembly mounted at the lower end of an elongate pump shaft and a nonmagnetic barrier between the driving and the driven magnet assemblies.

9 Claims, 3 Drawing Sheets

SUMP PUMP

BACKGROUND OF THE INVENTION

This invention relates to an improved sump pump, that is, a pump that has an impeller chamber that can be immersed in a pit to draw liquid up out of the pit. Sump pumps are driven by a shaft extending downwardly from a drive motor positioned above the pit. Normally, the motor is oriented so that it rotates on a vertical axis.

The journaling and protection of the shaft between the motor and the impeller presents a number of problems in the design of sump pumps. Sump pumps are either designed with bearings to support the shaft near the impeller end or with an overhung shaft with no bearings to support the shaft at the impeller end. Any shaft, and especially a shaft with an impeller mounted on the distal end thereof, has the potential to be out of balance. Minor eccentricities in the shaft or impeller cause the center of gravity of the shaft and impeller to not be aligned with the axis of rotation. In this case, there is a strong tendency for the shaft to wobble. This wobble may result in contact between the impeller and the impeller chamber which can destroy each.

It is difficult to inexpensively build a rugged sump pump that has an overhung shaft that is balanced and remains in balance. Placing bearings at the bottom of the shaft also presents problems since the forces that would cause vibration in an overhung shaft hasten the wear of the bearings. These bearings would also be subject to corrosion of the pump liquid and/or require alternate liquid for cooling frictional heat build up.

Whether or not the shaft is journaled at each end or overhung, the shaft will be subject to corrosion when liquid seeps past the impeller up along the shaft. In many sump pumps, the shafts are provided with an expensive coating to protect them from the liquid. Even more of a problem is the protection of the electric motor at the top of the shaft from liquid and/or vapors rising along the shaft. Frequently, a small auxiliary impeller is positioned at the lower end of the shaft to pump liquid down out of the space along the shaft. Also, frequently, vapor seals which wear out over time are placed around the shaft near the motor.

It is an object, according to the present invention, to provide a sump pump without the need for special shaft coatings/sleeves, impellers to evacuate the space along the shaft or vapor seals.

It is a further object to provide a sump pump that has a sealed space surrounding the shaft between the motor and the immersible impeller chamber.

SUMMARY OF THE INVENTION

According to this invention, there is provided a sealess sump pump having an electric motor and an impeller chamber spaced from the electric motor so that the impeller can be immersed in a liquid filled pit. The sump pump has an electric motor with a motor shaft extending downwardly therefrom. A pump column extends downwardly from the motor along the shaft. An impeller chamber is mounted at the bottom of the pump column. The impeller chamber is provided with an inlet port and an outlet port. An impeller, when caused to rotate within the impeller chamber, draws liquid into the inlet port and forces liquid out the outlet port. An elongate shaft extending downwardly from the motor shaft within the pump column has a driving magnet assembly mounted at the lower end of the shaft. A driven magnet assembly is secured to the impeller in a manner to rotate with the impeller. A cylindrical nonmagnetic barrier between the driving and driven magnet assemblies seals the lower end of the pump column from the impeller chamber. The driving magnet assembly comprises a ferromagnetic ring with an even number of rare earth magnets equally spaced around the inner circumference of the ring. The magnets are radially polarized and alternate in polarity. The driven magnet assembly has a ferromagnetic ring with a number of rare earth magnets equal to the number in the driving magnet assembly spaced around the outer circumference of the ring. These magnets also are radially polarized and alternating in polarity. Typically, the length of the shaft between the motor face and the driving magnet assembly is at least 8 inches. In an alternate embodiment of this invention, an intermediate radial ball bearing supports the pump shaft and the distance between the bearing and the motor face is at least about 10 inches.

According to yet another embodiment of this invention, an extension of the pump shaft through the driven magnet assembly is journaled in a bearing or a bushing supported by the nonmagnetic barrier.

Preferably, according to this invention, the pump column is sealed to the motor to define a hermetically sealed space surrounding the pump shaft. It is an advantage, according to this invention, that the radial clearance between the driving and driven magnetic assemblies and the nonmagnetic barrier may be 1/32 of an inch and even up to and more than 1/4 of an inch. Further, it is also an advantage that the radial aspect ratio of the clearance to its length be equal to or larger than 0.10.

BRIEF DESCRIPTION OF THE DRAWINGS

Further features and other objects and advantages of this invention will become clear from the following detailed description with reference to the drawings in which.

DESCRIPTION OF THE PREFERRED EMBODIMENTS

Figure 1:
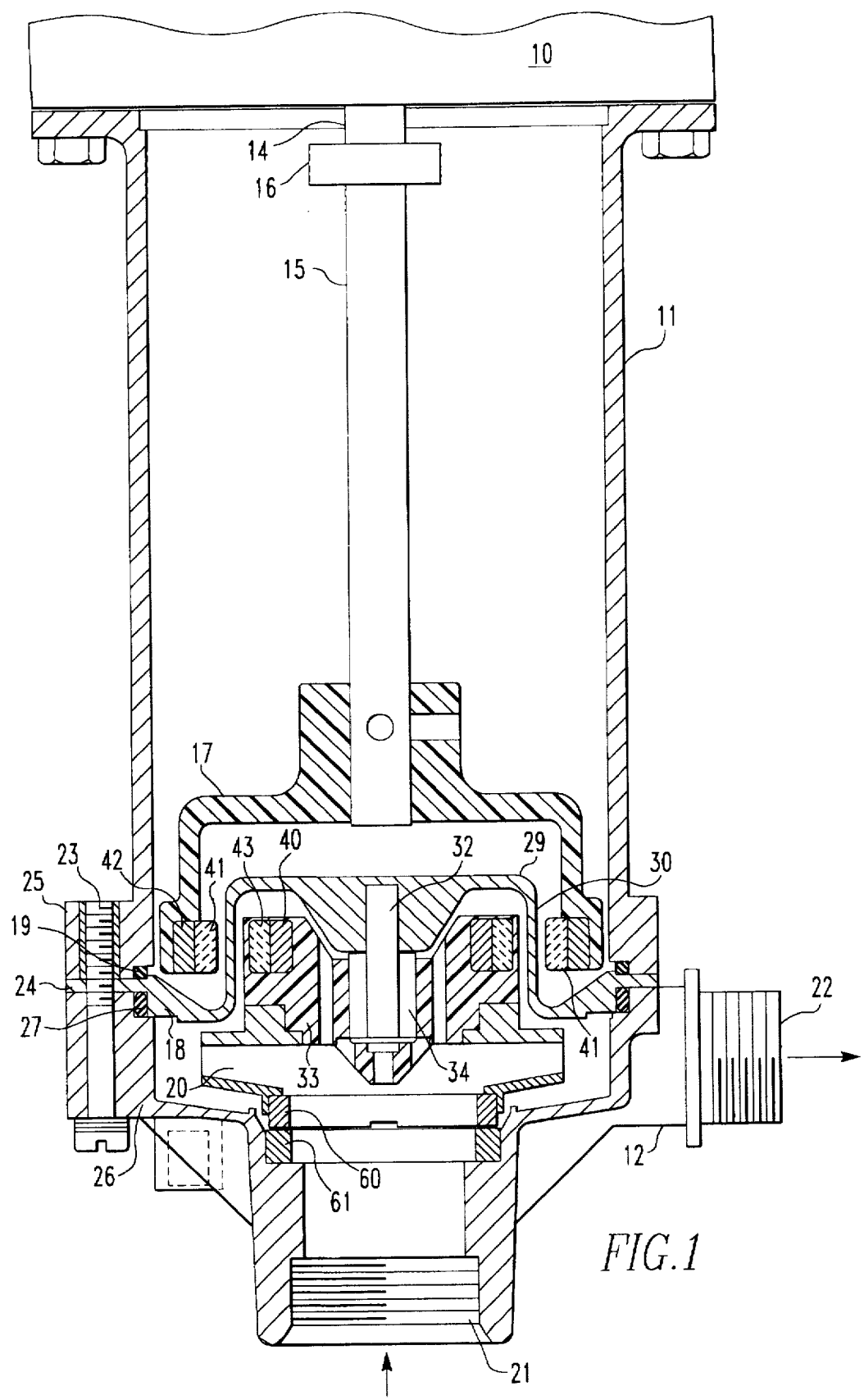
FIG. 1 is a section view of a first embodiment of a sump pump according to this invention with an overhung pump shaft.

Referring now to FIG. 1, there is illustrated a sump pump, according to this invention, comprising a motor 10, pump column 11 and impeller housing 12 assembled together as a unit. The pump column spaces the motor from the impeller housing so that the motor can be above the pit and the impeller housing can be immersed. The motor 10 is arranged for its output shaft 14 to rotate on a vertical axis. The pump column 11 is typically a cylinder with no openings therein except those closed by the motor and the impeller housing.

A pump shaft 15 is coupled to the motor output shaft 14 by coupling 16. It would, of course, be acceptable if the pump shaft and the motor shaft were integral and no coupling was required.

Mounted at the lower end of the pump shaft is the driving magnet assembly 17 which is discussed in more detail hereafter. The length of the pump shaft between the motor and the driving magnet assembly is greater than 8 inches. At this length of shaft, the problems associated with imbalance become increasingly apparent in sump pumps according to the prior art. As shown in FIG. 1, the shaft is overhung, that is, it is not supported by a bearing or a bushing near the driving magnet assembly 17.

A modification of the overhung embodiment shown in FIG. 1 would be a longer pump column which supports an intermediate radial bearing for the shaft which may be a sealed ball bearing that does not require liquid lubrication or cooling. This is possible and to some extent essential as the lower end of the pump column is closed off by nonmagnetic barrier 18. The barrier, when clamped or bolted to the pump column, forms a liquid-tight seal as a result of an O-ring or gasket 19 or simply as a result of a pressure fit providing a hermetic seal between the cylindrical flange at the lower end of the pump column and a radial flange extending from the nonmagnetic barrier 18.

An impeller 20 is journaled for rotation within the impeller chamber. Upon rotation, it draws liquid up through inlet port 21 and expels liquid through outlet port 22. Inlet port 21 may have internal threads for receiving an extension pipe. The impeller chamber does not need to be at the very bottom of the pit so long as the impeller chamber can be primed. The outlet port may have external threads to attach to an exhaust conduit. The nonmagnetic barrier 18 may have radial flanges 24 which are captured between a radial flange 25 on the pump column 11 and a radial flange 26 on the impeller housing. The three radial flanges are clamped by bolts 23 passing through holes provided in the flanges 24 and 26 and engaging threads provided in flange 25. An O-ring or gasket 27 squeezed between the flanges seals the impeller chamber.

The nonmagnetic barrier has an inverted cup-shaped portion 29 which nests inside of the driving magnet assembly. The inverted cup portion of the nonmagnetic barrier has a cylindrical wall 30 with an axis that substantially coincides with the axis of the shaft 15. A cylindrical pin 32 is fixed to the nonmagnetic barrier. The axis of the pin 32 also substantially coincides with the axis of the motor shaft and pump shaft. Pin 32 is journaled on bushing 34 in driven magnet assembly 33. The impeller 20 is attached to the bottom of the driven magnet assembly 33. (In an alternate configuration, the pin 32 may be fixed to the driven magnet assembly and the bushing 34 may be fixed in the nonmagnetic barrier.)

The pin 32 and bushing 34 provide radial constraint for the driven magnet assembly and the impeller. They do not necessarily provide axial constraint. The strong magnetic forces between the magnets 41 and 43 will hold the driven magnet assembly in a fixed axial position. The ability of the magnets 41 and 43 to do so is related to the strength of the rare earth magnets and the short axial length thereof. The bushings 60 and 61 shown in FIG. 1 are normally not engaged due to the thrust support of the magnets 41 and 43. Typically, the magnets have a circumferential face such that the circumferential and axial dimensions are within 50% of each other.

The driven magnet assembly 33 has a ferromagnetic ring 40 mounted therein. Secured on the outer cylindrical face of the ring 40 is a plurality of permanent magnets of the rare earth type 43. The ring and the magnets are encapsulated in a nonmagnetic resin to protect them from attack by corrosive liquids in the impeller chamber. The driving magnet assembly 17 also has a ferromagnetic ring 42, for example, steel, mounted around the rim thereof with a plurality of permanent magnets 41 mounted thereon. The magnets 41 and 43 are radially polarized and alternate polarity moving around either ring. An even and equal number of magnets are positioned on each ring. Most preferably, the driving magnet assembly 17 and driven magnet assembly 33 are constructed according to our invention set forth in a copending application filed of even date herewith entitled "Magnetic Drive". That application is incorporated herein by reference.

Figure 2:
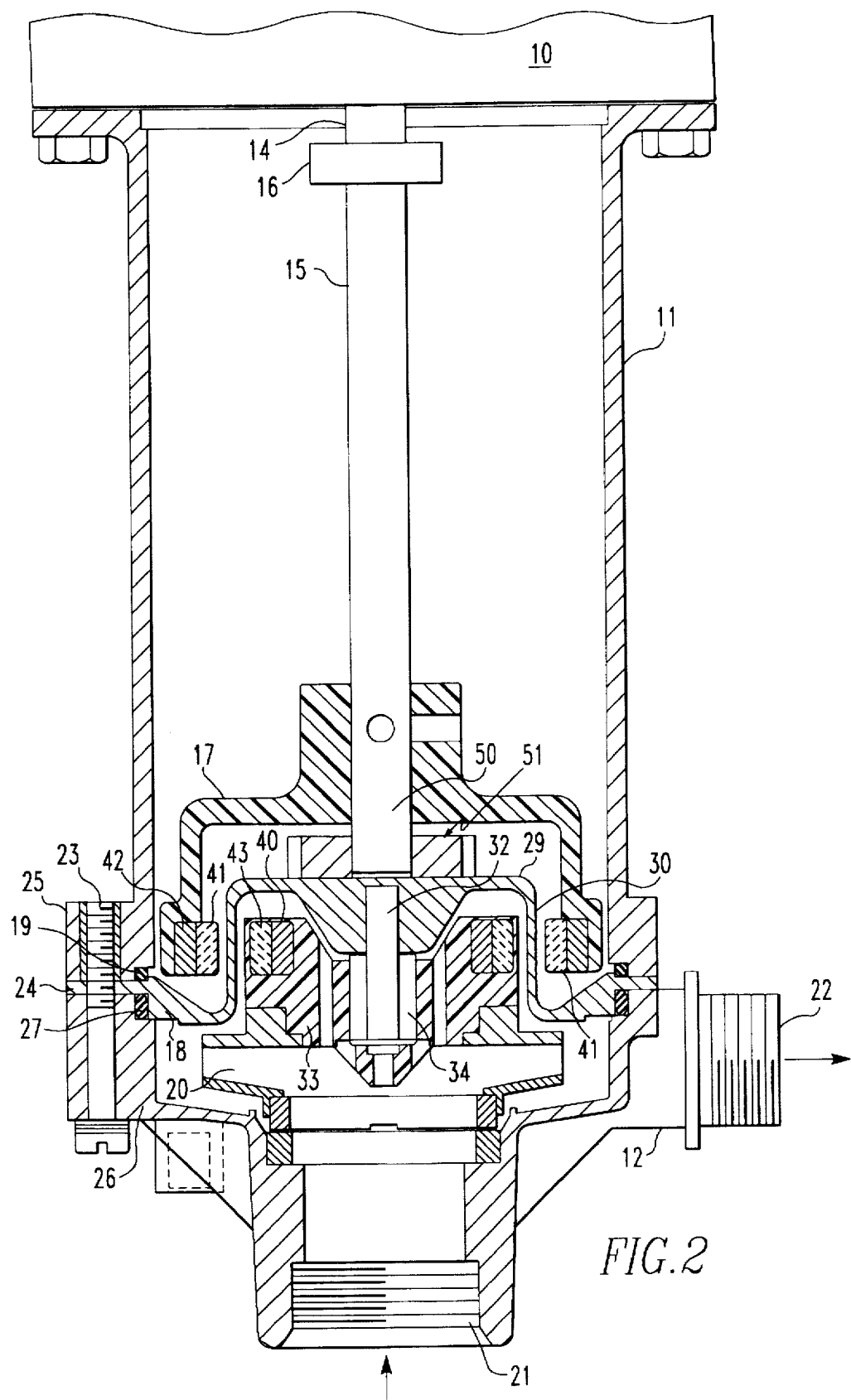
FIG. 2 is a section view of another embodiment of this invention with a pump shaft journaled at the lower end.
Figure 3:
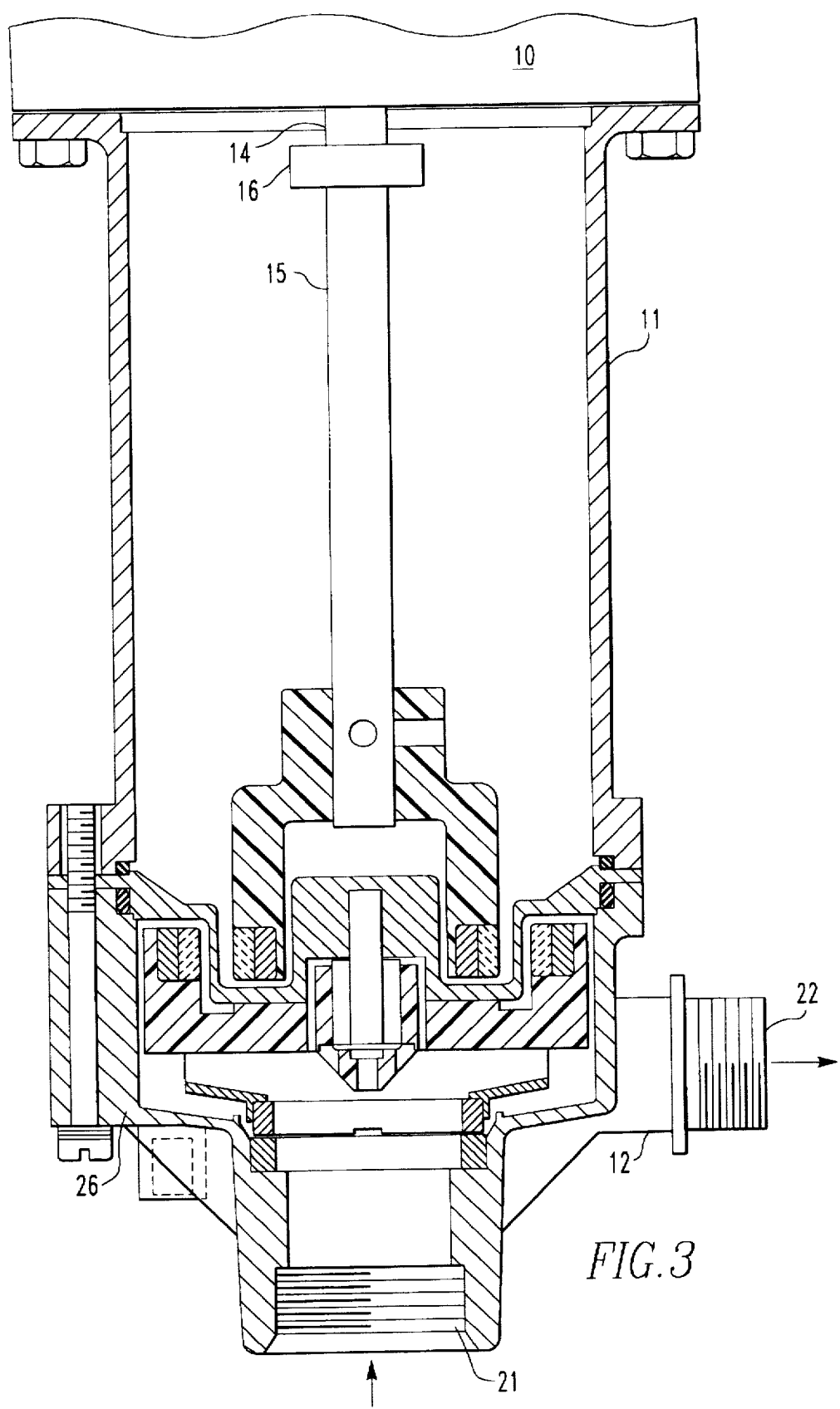
FIG. 3 is a section view of an embodiment of this invention wherein the driven magnet assembly is radially outward of the driving magnet assembly.

Referring to FIG. 2, the elements in common with the embodiment illustrated in FIG. 1 are identified with the same numerals and the written description of FIG. 1 equally applies to FIG. 2 except as hereafter explained. The shaft 15 has an extension 50 that is journaled in a bushing or bearing which is fixed to the nonmagnetic barrier 18. The bushing or bearing 51 provides radial support for the shaft at its lower end. As with the optional intermediate radial bearing described above, it may be a sealed bearing that does not require liquid cooling or lubrication. However, since the liquid being pumped washes across the nonmagnetic barrier 18 cooling the barrier, the barrier is cooled and may thereby draw heat from the bearing 51.

As used in this application, the term rare earth magnets comprises magnets of the samarium cobalt or neodymium iron boron type.

The pump column 11, impeller housing 12 and impeller 20 may be fabricated of any metal or plastic that has sufficient strength and toughness. The driving and driven magnet assemblies are preferably tough plastic which, being nonmagnetic, will not interfere with the magnetic circuits provided by the ferromagnetic rings associated therewith. The nonmagnetic barrier should be made from strong and tough plastic, brass or nonmagnetic stainless steel, for example.

Sump pumps, according to this invention, whether similar to the embodiment illustrated in FIG. 1 or the embodiment illustrated in FIG. 2, overcome the disadvantages associated with journaling and protecting the pump shaft. The problem which may be associated with imbalance in the impeller is overcome by having no physical connection between the impeller and the pump shaft. Forces of mechanical and hydraulic imbalance on the impeller are resisted by the pin 32 and bushing 34. Forces of imbalance caused by eccentricities in the pump shaft which may have a tendency to cause a certain degree of wobble of the driven magnet assembly attached to the overhung shaft of FIG. 1 are harmless due to the clearance that may be provided between the driven magnet assembly and the cylindrical wall of the nonmagnetic barrier. The pump will not transmit harmful mechanical loads in the axial direction due to the lack of a journaled joint between the driving and driven magnet assemblies. Also eliminated are the detrimental downward forces which are induced on the impeller from the hydraulics. The pump shaft need not be coated or sleeved and a vapor seal to protect the motor and/or environment need not be provided because liquid and vapors never enter the space between the pump column and the pump shaft. Also, the shaft does not need to be so rigid and or massive. Because the impeller chamber is completely sealed from the space between the pump column and the pump shaft, there is no need for an additional impeller to draw liquid down out of that space.

Having thus described our invention with the detail and particularity required by the Patent Laws, what is desired protected by Letters Patent is set forth in the following claims.

We claim:

1. A sealess sump pump having an electric motor and an impeller chamber spaced from the electric motor so that the impeller can be immersed in a liquid filled sump comprising:

an electric motor having a motor shaft extending downwardly therefrom;

a pump column extending downwardly from the motor;

an impeller chamber mounted at the bottom of the pump column, said impeller chamber having an inlet port and an outlet port;

an impeller journaled in the impeller chamber which when caused to rotate draws liquid into the inlet port and forces liquid out the outlet port;

a driven magnet assembly fixed to rotate with the impeller;

an elongate shaft extending downward from the motor shaft within the pump column, the length of said shaft and the driving magnet assembly being at least 8 inches;

a driving magnet assembly mounted at the lower end of the elongate shaft; and a cylindrical nonmagnetic barrier between the driving and the driven magnet assemblies which seals the lower end of the pump column;

said driving magnet assembly comprising a ferromagnetic ring with an even number of rare earth magnets equally spaced around the inner circumference of the ring, said magnets radially polarized and alternating in polarity;

said driven magnet assembly having a ferromagnetic ring with a number of rare earth magnets equal to the number of magnets in the driving magnet assembly equally spaced around the outer circumference of the ring, said magnets being radially polarized and alternating in polarity.

2. A sump pump according to claim 1, in which the distance between the motor face and an intermediate bearing supporting the shaft is at least 8 inches.

3. A sump pump according to claim 1, in which the lower end of the shaft is supported radially and/or axially by a bearing or bushing fixed to the driving magnetic assembly side of the nonmagnetic barrier.

4. A sump pump according to claim 1, wherein the impeller and driven magnet assembly have no mechanical thrust bearing and are held in the axial position by the attraction of the magnets in the driving and driven magnet assemblies.

5. A sump pump according to claim 1, wherein the shaft housing is sealed to the motor to define a hermetically sealed space surrounding the shaft.

6. A sump pump according to claim 1, wherein the radial clearance between the driving and driven magnetic assemblies are spaced at least 1/32 of an inch from the nonmagnetic barrier.

7. A sump pump according to claim 1, wherein the radial distance between the driving and driven magnet cylindrical surfaces is at least 1/4 of an inch.

8. A sump pump according to claim 1, wherein the driven magnet assembly is radially outward of the driving magnet assembly.

9. A sump pump according to claim 1, wherein the driving magnet assembly is radially outward of the driven magnet assembly.

* * * * *

UNITED STATES PATENT AND TRADEMARK OFFICE
CERTIFICATE OF CORRECTION

PATENT NO. : 5,708,313
DATED : January 13, 1998
INVENTOR(S) : H. David Bowes and Jeffrey S. Richmond It is certified that error appears in the above-indentified patent and that said Letters Patent is hereby corrected as shown below:

Title Page, [57] ABSTRACT, line 1 "sealess" should read --sealless--.

Column 1 Line 12 "presents" should read --present--.

Column 1 Line 31 "build up" should read --buildup--.

Column 1 Line 53 "sealess" should read --sealless--.

Column 2 Line 39 after "shaft;" delete --and--.

Column 4 Line 53 "and or" should read --and/or--.

Claim 1 Column 4 Line 63 "sealess" should read --sealless--.

Signed and Sealed this

Seventh Day of July, 1998

Attest:

BRUCE LEHMAN

*Attesting Officer*  *Commissioner of Patents and Trademarks*